United States Patent
Sato (10) Patent No.: US 8,081,793 B2
(45) Date of Patent: Dec. 20, 2011

(54) ELECTRONIC WATERMARKING METHOD AND APPARATUS FOR COLOR IMAGE DATA

(75) Inventor: Kimitoshi Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 970 days.

(21) Appl. No.: 11/616,060

(22) Filed: Dec. 26, 2006

(65) Prior Publication Data

US 2007/0147657 A1 Jun. 28, 2007

(30) Foreign Application Priority Data

Dec. 27, 2005 (JP) ................................. 2005-374593

(51) Int. Cl.
*G06K 9/00* (2006.01)
*G06K 9/36* (2006.01)
(52) U.S. Cl. ...................................... 382/100; 382/232
(58) Field of Classification Search .................... 380/51, 380/54, 210, 287; 382/100, 232; 358/3.28; 713/176
See application file for complete search history.

(56) References Cited

U.S. PATENT DOCUMENTS

| 4,481,532 A * | 11/1984 | Clark et al. ................... 358/519 |
| 4,975,769 A * | 12/1990 | Aizu et al. ..................... 358/517 |
| 5,506,699 A * | 4/1996 | Wong ........................... 358/3.08 |
| 5,960,110 A * | 9/1999 | Usami ........................... 382/167 |
| 6,765,691 B2 * | 7/2004 | Kubo et al. .................... 358/1.9 |
| 2003/0076979 A1 * | 4/2003 | Matsui .......................... 382/100 |

FOREIGN PATENT DOCUMENTS

| JP | 09-107483 | * | 4/1997 |
| JP | 2003179740 A | | 6/2003 |
| JP | 2004159349 A | | 6/2004 |
| JP | 2004-289783 A | | 10/2004 |
| JP | 2005354188 A | | 12/2005 |

\* cited by examiner

*Primary Examiner* — Anand Bhatnagar
*Assistant Examiner* — Amara Abdi
(74) *Attorney, Agent, or Firm* — Panitch Schwarze Belisario & Nadel LLP

(57) ABSTRACT

Multi-color image data received from a host device are divided into blocks. The brightness of at least a first color in each block is tested to determine whether the block is watermarkable. An electronic watermark is embedded into each watermarkable block by modifying the image data of at least a second color. The image data of the second color can then be combined with image data of the other colors to generate watermarked output image data or print a watermarked image. The electronic watermark can be read from the watermarked image with a low error rate.

8 Claims, 7 Drawing Sheets

ELECTRONIC WATERMARKING METHOD AND APPARATUS FOR COLOR IMAGE DATA

BACKGROUND OF THE INVENTION

1. Field of the Invention

The present invention relates to electronic watermarking, more particularly to a data processing method, apparatus, and system for adding an electronic watermark to color image data.

2. Description of the Related Art

Hardcopy documents created by word processing software, spreadsheet software, and the like are conventionally printed as binary data, that is, as digital image data. To prevent unauthorized alteration, misappropriation, and unauthorized disclosure of such digital image data, data processing methods that embed electronic watermarks in the image data have been proposed.

Electronic watermarking is not a simple matter. One problem is that the amount of electronic watermark data that can be correctly read from a watermarked image varies depending on the content of the image. In many cases the error rate in reading the watermark data also varies depending on the location at which the watermark is embedded in the image.

Digital image data generally include redundancy that cannot be visually perceived; electronic watermarks are particularly effective when they are embedded in the redundant part of the digital image data and are not perceptible to human vision. Japanese Patent Application Publication No. 2004-289783 proposes one method aimed at such embedding, but this publication contemplates only monochrome images and its method cannot be easily applied to color images.

SUMMARY OF THE INVENTION

An object of the present invention is to provide a method of finding low-error-rate locations in which to embed electronic watermarks in color image data.

The invented method processes multi-color image data received from a host device. The method includes:

dividing the multi-color image data into blocks representing different image areas;

deciding, from the brightness of at least a first color in each block, whether the block is watermarkable; and embedding the electronic watermark into each watermarkable block by modifying the image data of at least a second color.

The image data of the second color can then be combined with image data of other colors to generate watermarked output image data.

Image data of the first color may be generated by combining the multi-color image data received from the host device. If the host device does not provide data for the second color, the image data of the second color may also be generated by combining the multi-color image data received from the host device. The first color may be gray, the second color may be black, and the data received from the host device may include image data for a plurality of primary colors other than black and gray.

The invented method provides a simple way to select image areas in which to embed electronic watermark data that can be read with a low error rate from a watermarked color image.

The invention also provides data processing apparatus operating according to the above method.

BRIEF DESCRIPTION OF THE DRAWINGS

In the attached drawings:

FIGS. 3(A) to 3(D) and 4(A) to 4(K) illustrate the flow of operations in the creation a data block table in the first embodiment;

FIG. 6 is a first threshold matrix used to represent a gray scale with bi-level data by a screen method in the second embodiment;

DETAILED DESCRIPTION OF THE INVENTION

Embodiments of the invention will now be described with reference to the attached drawings, in which like elements are indicated by like reference characters.

First Embodiment

Figure 1:
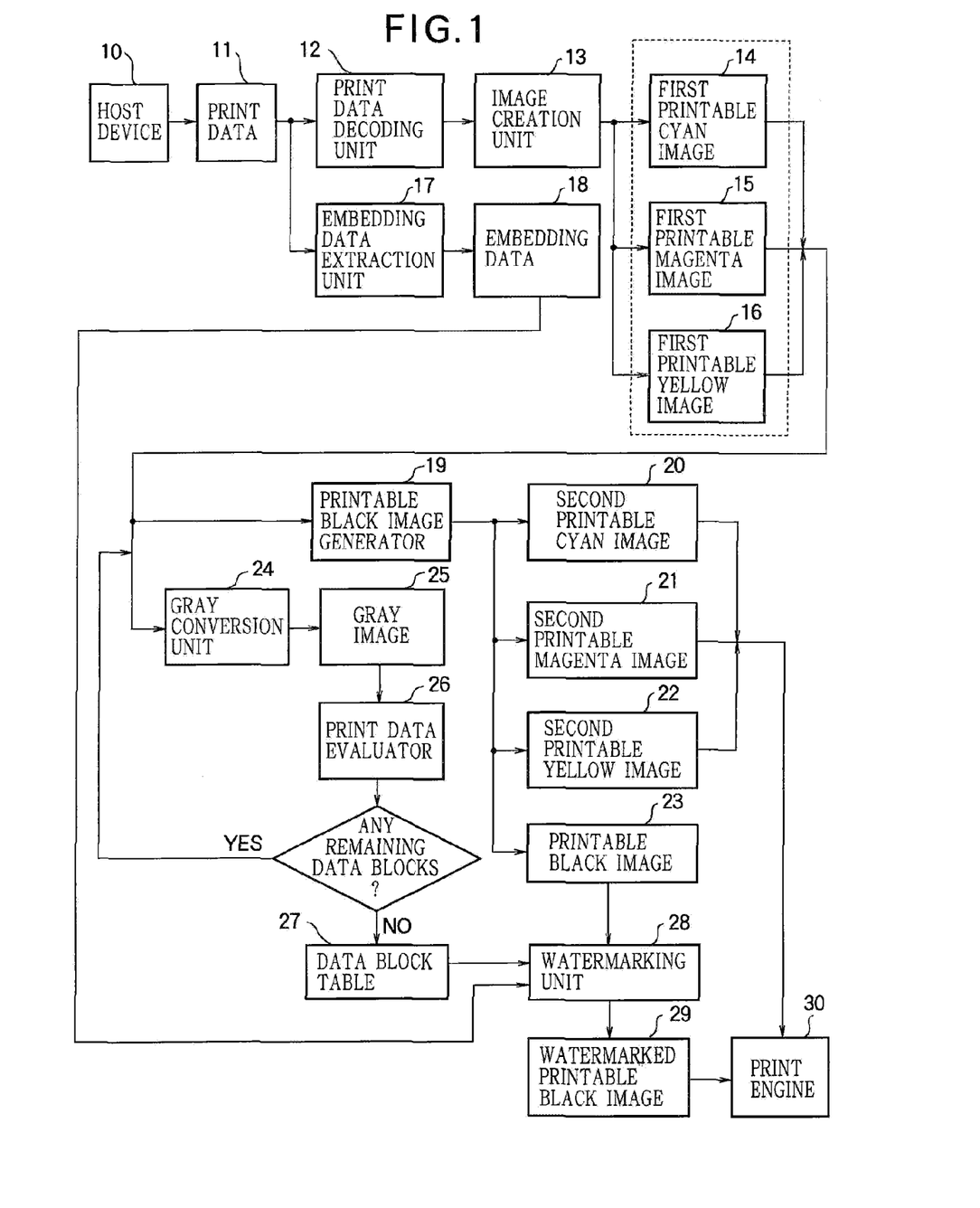
FIG. 1 is a block diagram showing the functional blocks and data of a data processing system in a first embodiment of the invention.

Referring to FIG. 1, the first embodiment is a system comprising a data processing apparatus in a printer connected to a host device 10. The host device 10 is typically a computer such as a personal computer, workstation, server, or other type of computer having a processor such as a central processing unit (CPU), microprocessor unit (MPU), or the like, memory means such as a magnetic disk, semiconductor memory, and the like, input means such as a keyboard and mouse, display means such as a cathode-ray tube (CRT) or liquid crystal display, a communication interface, and other necessary facilities. The host device 10 may however be any type of apparatus that can create and transmit print data 11 for printing color images.

The printer including the data processing apparatus in the first embodiment is communicably connected to the host device 10 by a network such as a local area network (LAN). The printer may employ any type of printing technology, such as ink jet, electrophotographic, or thermal transfer printing, and may be provided with additional functions such as facsimile, copying, and scanning functions. In the description below, it will be assumed that the printer prints full-color images, but this is not a necessary restriction; the printer may be a monochrome printer capable of converting color image data to monochrome image data.

The print data 11 created by the host device 10 include print data coded in a page description language (PDL) and electronic watermark data to be embedded in the printed image. In the data processing apparatus, a print data decoding unit 12 extracts the PDL-coded print data, and an embedding data extraction unit 17 extracts the electronic watermark data.

The print data extracted by the print data decoding unit 12 are sent to the image creation unit 13, and are converted to a first printable cyan image 14, a first printable magenta image 15, and a first printable yellow image 16. The first printable cyan, magenta, and yellow images 14, 15, 16 are sent to a printable black image generator 19 and an image converter or gray conversion unit 24.

The printable black image generator 19 performs a black generation process to generate a second printable cyan image 20, a second printable magenta image 21, a second printable yellow image 22, and a printable black image 23. The black generation process includes under color removal (UCR), and may also use a skeleton black technique to avoid unnecessary use of black. A process of this type is described by equations (1) to (4) below. The process uses a skeleton curve y=f(x), in which the input (x) is the minimum (min) of the cyan (C), magenta (M), and yellow (Y) values, the output (K') being the black value. 'Under color removal' means that a proportion α (where α exceeds zero and is less than unity) of the black value is subtracted from the C, M, and Y values. The cyan, magenta, yellow, and black values output by the printable black image generator 19 are denoted C', M', Y', and K'.

$$K'=f\{\min(C,M,Y)\} \quad (1)$$

$$C'=C-\alpha K' \quad (2)$$

$$M'=M-\alpha K' \quad (3)$$

$$Y'=Y-\alpha K' \quad (4)$$

The gray conversion unit 24 converts the first printable cyan image 14, the first printable magenta image 15, and the first printable yellow image 16 to a gray image 25. The gray image 25 is input to a decision unit or print data evaluator 26. The print data evaluator 26 divides the gray image 25 into minimum watermark unit blocks, decides whether each data block is watermarkable, enters the result of each decision into a data block table 27, then decides whether a decision has been made for each data block, and if this is not the case, proceeds to the next block. This operation is repeated until the data block table 27 includes results for all of the data blocks.

The data block table 27, the embedding data 18 extracted by the embedding data extraction unit 17, and the printable black image 23 generated by the printable black image generator 19 are input to a watermarking unit 28. The watermarking unit 28 combines the printable black image 23 with the electronic watermark data to create a watermarked printable black image 29.

An output unit, more specifically a print engine 30, combines the second printable cyan image 20, the second printable magenta image 21, and the second printable yellow image 22 with the watermarked printable black image 29 and prints the combined watermarked image.

Figure 2:
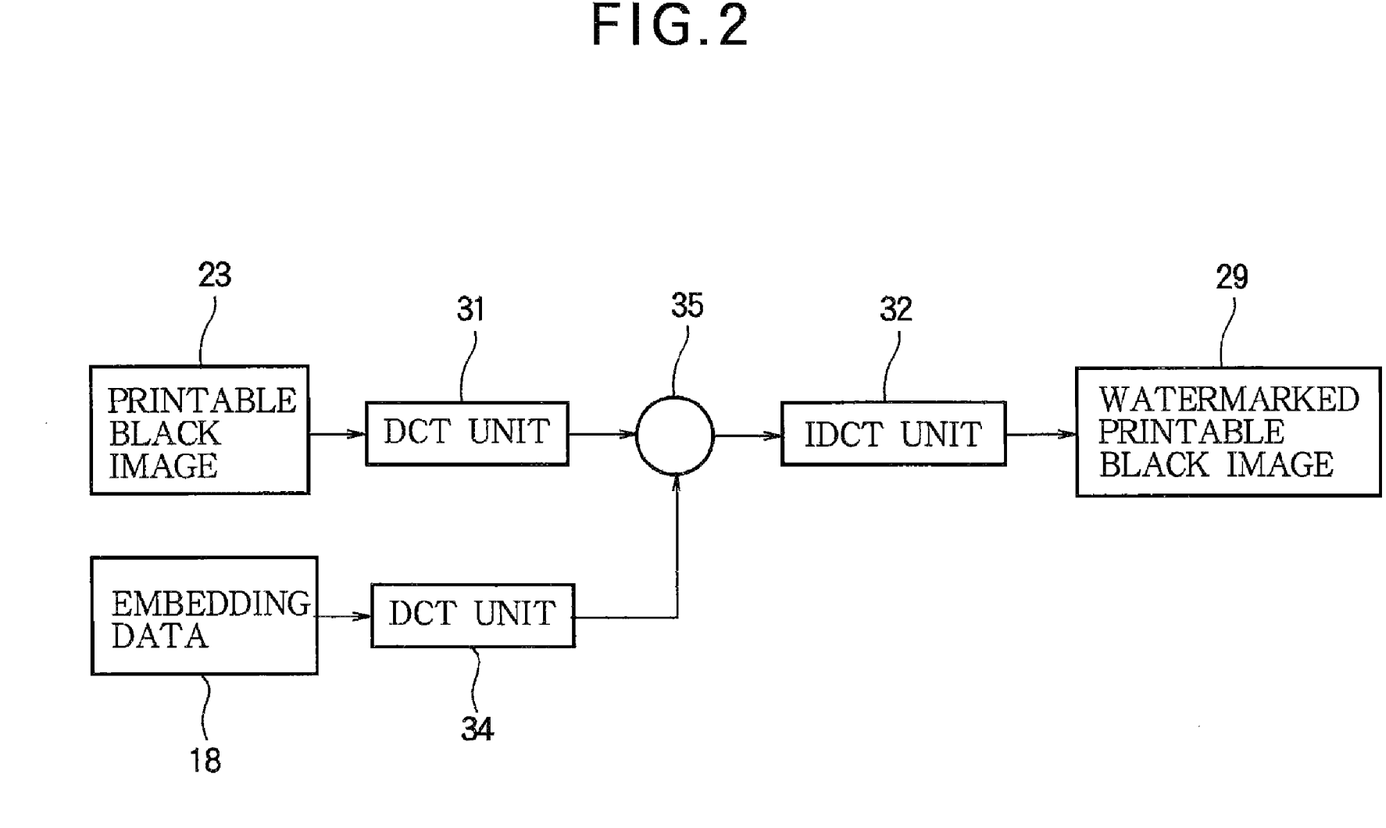
FIG. 2 is a block diagram showing the functional blocks and data of the watermarking unit in FIG. 1.

Next, the functional blocks and data that the watermarking unit 28 uses to create the watermarked printable black image 29 will be described in detail.

As shown in FIG. 2, the watermarking unit 28 embeds the electronic watermark data by a method that converts the printable black image 23 to the spatial frequency domain. More specifically, a discrete cosine transform (DCT) unit 31 performs a discrete cosine transform on the input printable black image 23. Another DCT unit 34 simultaneously performs a discrete cosine transform on the embedding data 18 that are received as the electronic watermark data. After a combiner 35 combines the transformed printable black image 23 with the transformed embedding data 18, an inverse discrete cosine transform (IDCT) unit 32 performs an inverse discrete cosine transform on the combined printable black image 23 and embedding data 18 to obtain the watermarked printable black image 29.

The embedding data 18 in the first embodiment convey information such as the copyright symbol (the letter C surrounded by a circle).

Next, the operation of the data processing system with the functional blocks described above will be described.

As described above, the print data 11 include two types of data: print data coded in a PDL and electronic watermark data to be embedded in the printed image. The print data decoding unit 12 decodes the PDL-coded print data. The image creation unit 13 converts the decoded print data to generate the first printable cyan image 14, the first printable magenta image 15, and the first printable yellow image 16. The embedding data extraction unit 17 extracts the electronic watermark data. The embedding data 18 extracted by the embedding data extraction unit 17 are temporarily stored in a memory area (not shown).

Figure 3:
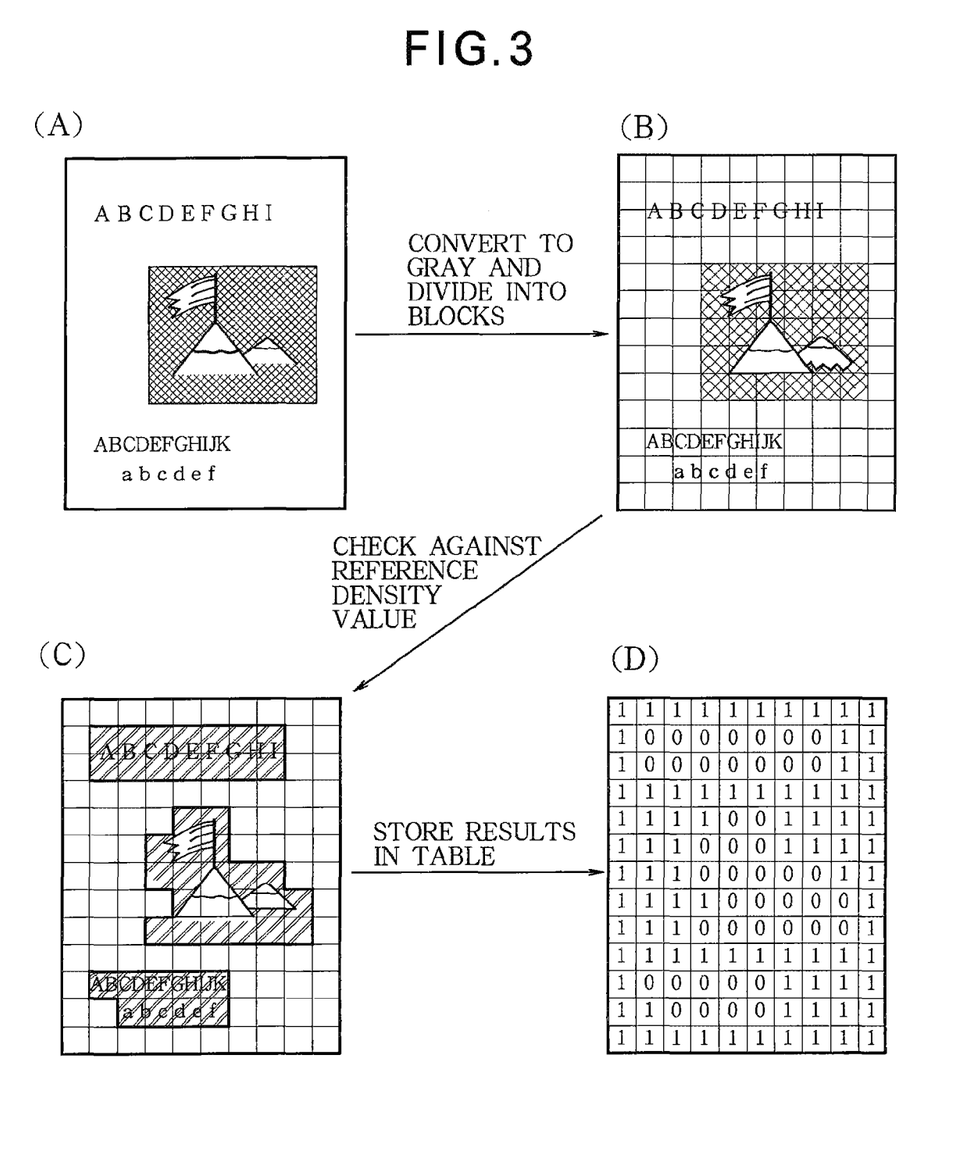

The gray conversion unit 24 converts the first printable cyan image 14, the first printable magenta image 15, and the first printable yellow image 16 to the gray image 25. FIG. 3 shows an example of an original image (A) represented by the print data before being converted to the gray image 25 by the gray conversion unit 24. The original image is a CMY 256-level full-color image created with 256 levels each of cyan, magenta, and yellow. The first printable cyan image 14, the first printable magenta image 15, and the first printable yellow image 16 are 256-level monochrome images.

The print data evaluator 26 divides the gray image 25 into minimum watermarking unit blocks, evaluates the watermarkability of each block according to its image density, and saves the results of these evaluations in the data block table 27. These processes are illustrated at (B) (C), and (D) in FIG. 3. The gray image 25 to which the original image (A) is converted is divided into minimum watermarking unit blocks as shown at (B). The result of evaluation of each block in (B) according to a reference density value required for embedding of an electronic watermark is shown at (C), the data blocks that have density values exceeding the reference value being indicated by hatching. The corresponding data block table 27 is shown at (D), the evaluation results now being indicated by zero's and one's. In each cell in the table (D), a zero ('0') means that the corresponding data block has a density value exceeding the reference density value; a one ('1') means that the data block has a density value equal to or less than the reference density value.

Figure 4:
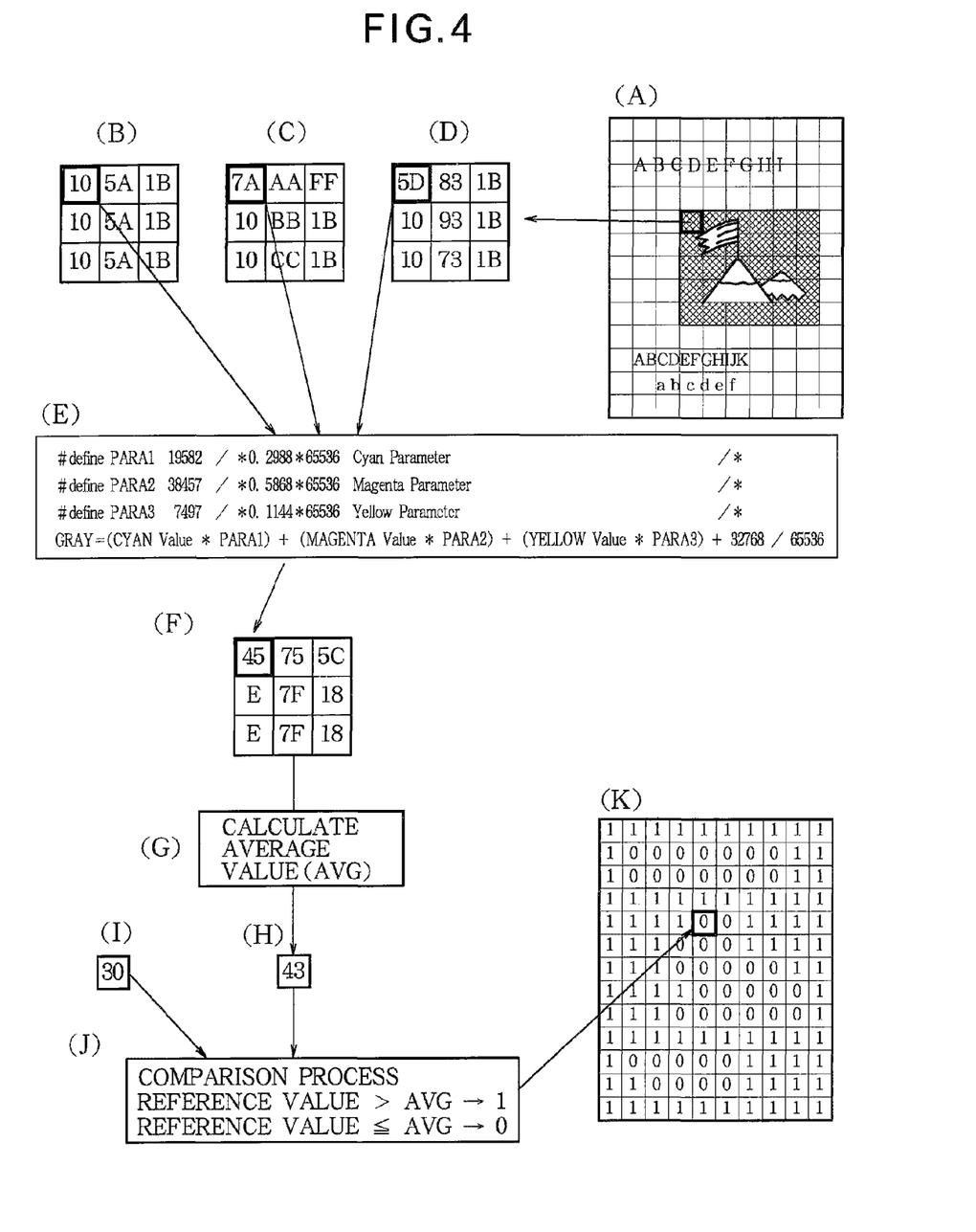

The process that creates the data block table 27 after conversion of the original image to the gray image 25 is illustrated in detail in FIG. 4. The gray image shown at (A) in FIG. 4 is substantially the same as the image at (B) in FIG. 3 and has been converted from the CMY 256-level original image at (A) in FIG. 3. The CMY 256-level original image data may be provided in either packed form or color plane form. The minimum watermark unit blocks into which this image (A) is divided in FIG. 4 will be assumed for simplicity to be three-by-three pixel blocks. In practice, the minimum watermark unit blocks may be larger; for example, if the discrete cosine transform used in the electronic watermarking process operates on eight-by-eight pixel blocks, the minimum watermarking unit blocks may be eight-by-eight blocks.

The cyan, magenta, and yellow values of one minimum watermarking unit block are shown at (B), (C), and (D) in FIG. 4. If the image data are in packed form, these values are obtained by first extracting the cyan, magenta, and yellow data planes. The blocks shown at (B), (C), and (D) in FIG. 4 have the same spatial coordinates. The gray level of each pixel is calculated from the cyan, magenta, and yellow values of the pixel by the formula (5) given below, which is also shown at (E) in FIG. 4.

```
# define PARA1 19582/*0.2988*65536                              (5)
Cyan Parameter*/
# define PARA2 38457/*0.5868*65536
Magenta Parameter*/
# define PARA3 7497/*0.1144*65536
Yellow Parameter*/
GRAY = ((CYAN Value*PARA1) + (MAGENTA Value*PARA2) +
(YELLOW Value*PARA3) + 32768)/65536
```

The cyan, magenta, and yellow data planes may be stored in separate memory areas, but this is not necessary. The gray value of each pixel may be calculated from the original image data. The parameter values PARA1, PARA2, and PARA3 should be adjusted according to the characteristics of the print engine 30. The parameter values shown above have been given as an example, and may be modified as necessary.

The gray values of the nine pixels of a minimum watermarking unit block after conversion of the original image to the gray image 25 are shown at (F) in FIG. 4.

Next, the average of the gray values of the pixels in the watermarking unit block is calculated ((G) in FIG. 4). An average gray density value such as the value shown at (H) in FIG. 4 is obtained as the result of calculation. The calculated average gray density value is compared with a reference density value (threshold value) such as the value shown in at (I) FIG. 4.

The comparison process is performed as shown at (J) in FIG. 4. If the reference density value exceeds the calculated average gray density value, the comparison result is one ('1'); if the reference density value is equal to or less than the calculated average gray density value, the comparison result is zero ('0').

The one or zero result given by the comparison process for each watermarking unit block is entered into the data block table 27. The resulting data block table 27 is shown at (K) in FIG. 4 (identical to table (D) in FIG. 3).

The print data evaluator 26 performs the operations shown at (E), (G), and (J) in FIG. 4.

The first printable cyan image 14, first printable magenta image 15, and first printable yellow image 16 are input to the printable black image generator 19. The printable black image generator 19 performs a black generation process as described in equations (1) to (4) above to add a black plane to the print data. The printable black image 23 is created by taking a common component from the first cyan, magenta, and yellow images. The second printable cyan image 20, second printable magenta image 21, and second printable yellow image 22 are created by subtracting a proportion of this common component.

Referring to the data block table 27, the watermarking unit 28 embeds electronic watermark data in the printable black image 23. The electronic watermark data are embedded only in blocks in which the results in the data block table 27 are indicated by one's. The embedded electronic watermark data are the embedding data 18 provided by the host device 10. When the electronic watermark data have been embedded in the printable black image 23, the printable black image 23 becomes the watermarked printable black image 29.

Finally, the print engine 30 prints the second printable cyan image 20, the second printable magenta image 21, the second printable yellow image 22, and the watermarked printable black image 29 on a sheet of printing media.

As described above, in order to decide the locations in which the electronic watermark data can be embedded in the image, the first embodiment converts the color image data to a gray image 25 and evaluates the gray image 25. The first embodiment therefore provides a lower error rate in reading the watermark data than do data processing methods that only evaluate the black plane data in which the electronic watermark data are embedded.

In this embodiment, as shown in FIG. 1, the first color, which is evaluated to identify watermarkable blocks, is gray and the second color, which is modified to embed the watermark, is black. The host device supplies data representing monochrome images in three other colors (cyan, magenta, and yellow); these images are converted to a gray image, and are also processed to generate a black image. It will be appreciated, however, that the first embodiment is not limited to this arrangement.

In one exemplary variation, the first color is cyan and the second color is black. The host device supplies data for a monochrome cyan image and a monochrome black image. The cyan image is divided into blocks and each block is evaluated as to watermarkability. Watermark data are then combined with the black image data in the watermarkable blocks to create a modified black image, and watermarked output data including the modified black image data and the original cyan image are output for printing. In this variation, no gray image is generated.

Second Embodiment

Figure 5:
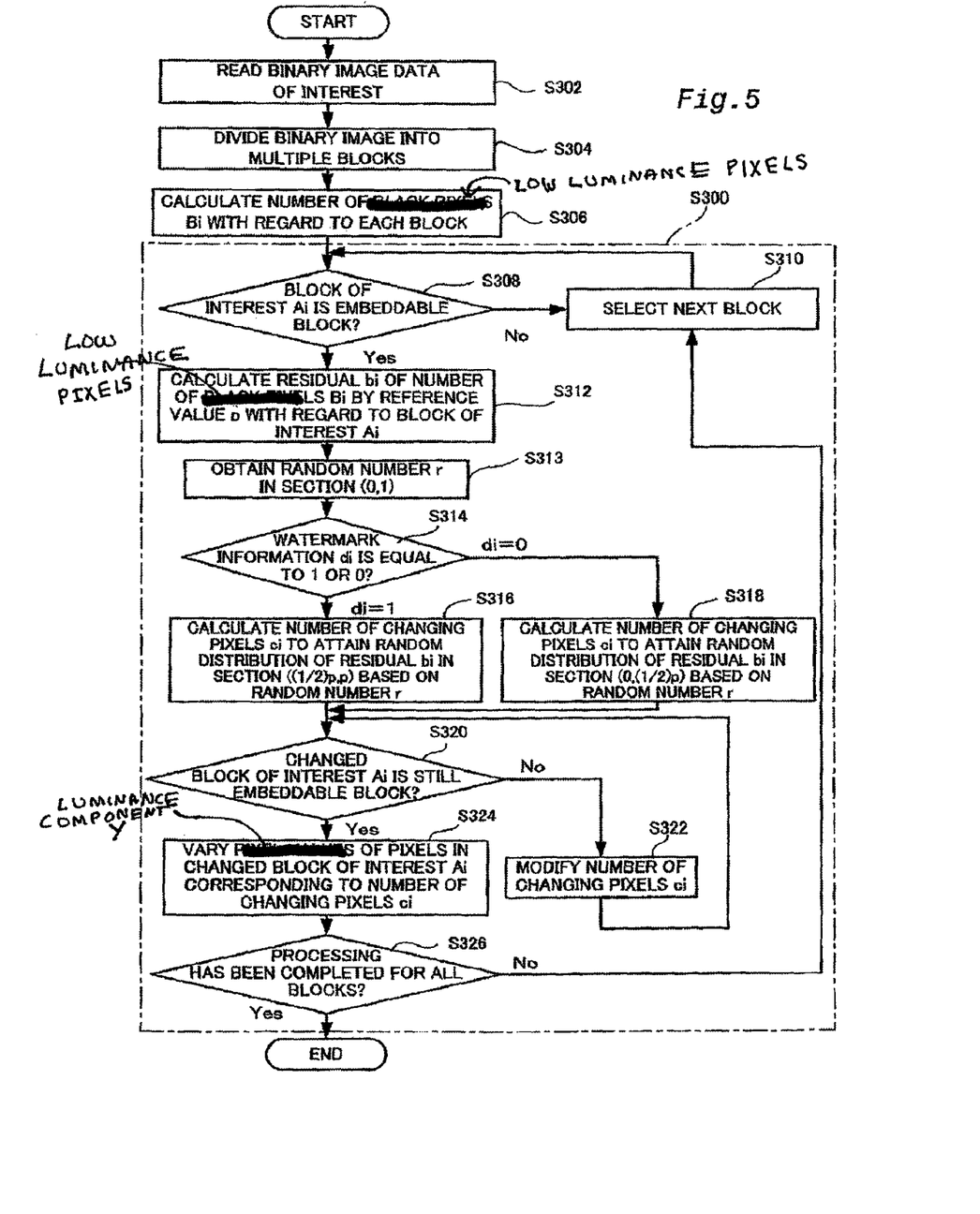
FIG. 5 is a block diagram showing the functional blocks and data of a data processing system in a second embodiment of the invention.

In the second embodiment, illustrated in FIG. 5, the print data 11 created by the host device 10 include PDL-coded print data and electronic watermark data to be embedded in the printed image as in the first embodiment. In the data processing apparatus, a print data decoding unit 12 extracts the PDL-coded print data, and an embedding data extraction unit 17 extracts the electronic watermark data.

The image creation unit 13 in the second embodiment converts the print data extracted by the print data decoding unit 12 to a printable cyan image 41, a printable magenta image 42, a printable yellow image 43, and a printable black image 44, all of which comprise bi-level data.

The printable cyan image 41, the printable magenta image 42, the printable yellow image 43, and the printable black image 44 are sent to a mapping unit, more specifically a 256-level gray-scale image generator 45 that maps the bi-level data onto a 256-level gray scale. The printable cyan image 41, the printable magenta image 42, the printable yellow image 43, and the printable black image 44 are accordingly converted to 256-level cyan data 46, 256-level magenta data 47, 256-level yellow data 48, and 256-level black data 49.

The 256-level cyan data 46, 256-level magenta data 47, and 256-level yellow data 48 are sent to a gray conversion unit 50 that converts these data to a gray image 51.

On receiving the gray image 51 and the 256-level black data 49, a black processing unit 52 combines the gray image 51 with the 256-level black data 49 and outputs a combined gray image 53. The gray conversion unit 50 and black processing unit 52 thus constitute an image converter that converts the cyan, magenta, yellow, and black data to generate gray image data.

The combined gray image 53 is input to the decision unit or print data evaluator 54. The print data evaluator 54 divides the gray image 51 into minimum watermarking unit blocks, and decides whether each data block is watermarkable. The print data evaluator 54 enters the result of each decision into a data block table 55, then decides whether a decision has been made for all data blocks, and if this is not the case, proceeds to the next block. This operation is repeated until the data block table 55 includes results for all of the data blocks.

The data block table 55, the embedding data 18 extracted by the embedding data extraction unit 17, and the printable black image 44 generated by the image creation unit 13 are input to a watermarking unit 56. The watermarking unit 56 combines the printable black image 44 with the electronic watermark data to create a watermarked printable black image 57.

An output unit or print engine 58 similar to the print engine 30 in the first embodiment combines the printable cyan image 41, printable magenta image 42, and printable yellow image 43 with the watermarked printable black image 57 and prints the combined watermarked image.

In converting bi-level data to 256-level data, the 256-level gray-scale image generator 45 reverses a process by which bi-level data are used to express a multi-level image. Such processes may employ, for example, the well-known dither method or the well-known screen method. The screen method will be outlined below.

Figure 7:
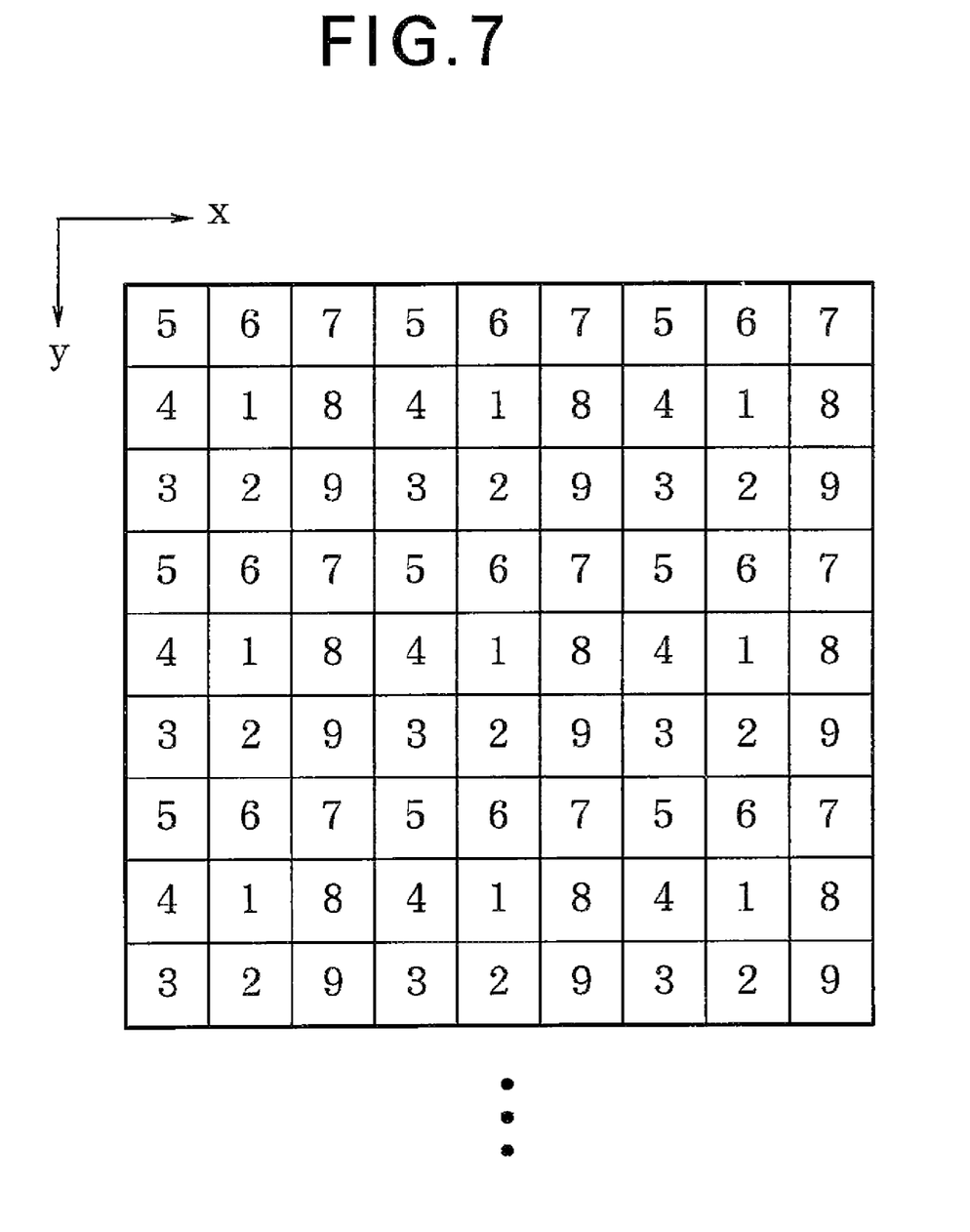
FIG. 7 is a second threshold matrix used in the screen method in the second embodiment.

FIGS. 6 and 7 illustrate the basic principle of the screen method. FIG. 6 shows a first threshold matrix with nine threshold values arranged in a spiral pattern. FIG. 7 shows a second threshold matrix consisting of cyclic repetitions of the first threshold matrix. In FIG. 7 the first threshold matrix is repeated three times each in the horizontal (x) and vertical (y) directions, but in general any number of repetitions can be used as required to cover the image being processed. Given a cyan image in which each pixel has a value from one to ten, the value of a pixel is compared with the threshold value at the identical location in the second threshold matrix. If the value of the pixel is higher than the threshold value, the output cyan value has a first value (a); if value of the pixel is equal to or less than the threshold value, the output cyan value has a second value (b). The result is a bi-level output image with an apparent gradation scale having ten levels from a to b.

If the first threshold matrix is a sixteen-by-sixteen matrix instead of the three-by-three matrix shown in FIG. 6, the apparent gradation scale has 257 levels. A 256-level cyan image can accordingly be expressed by bi-level data using the screen method and a sixteen-by-sixteen threshold matrix. The same applies to magenta, yellow, and black images.

Next, the operation of the data processing system in the second embodiment will be described.

As described above, the print data 11 include two types of data: PDL-coded print data and electronic watermark data to be embedded in the printed image. The print data decoding unit 12 decodes the PDL-coded print data. The image creation unit 13 converts the decoded print data to generate the printable cyan image 41, the printable magenta image 42, the printable yellow image 43, and the printable black image 44. The embedding data extraction unit 17 extracts the electronic watermark data. The embedding data 18 extracted by the embedding data extraction unit 17 are temporarily stored in a memory area (not shown).

After the 256-level gray-scale image generator 45 converts the printable cyan image 41, printable magenta image 42, printable yellow image 43, and printable black image 44 to 256-level cyan data 46, 256-level magenta data 47, 256-level yellow data 48, and 256-level black data 49, the gray conversion unit 50 converts the 256-level cyan data 46, 256-level magenta data 47, and 256-level yellow data 48 to the gray image 51. The black processing unit 52 combines the gray image 51 with the 256-level black data 49 to create the combined gray image 53. The print data evaluator 54 divides the combined gray image 53 into minimum watermarking unit blocks, evaluates the watermarkability of each block according to its image density, and saves the results of these evaluations in the data block table 55.

Figure 8:
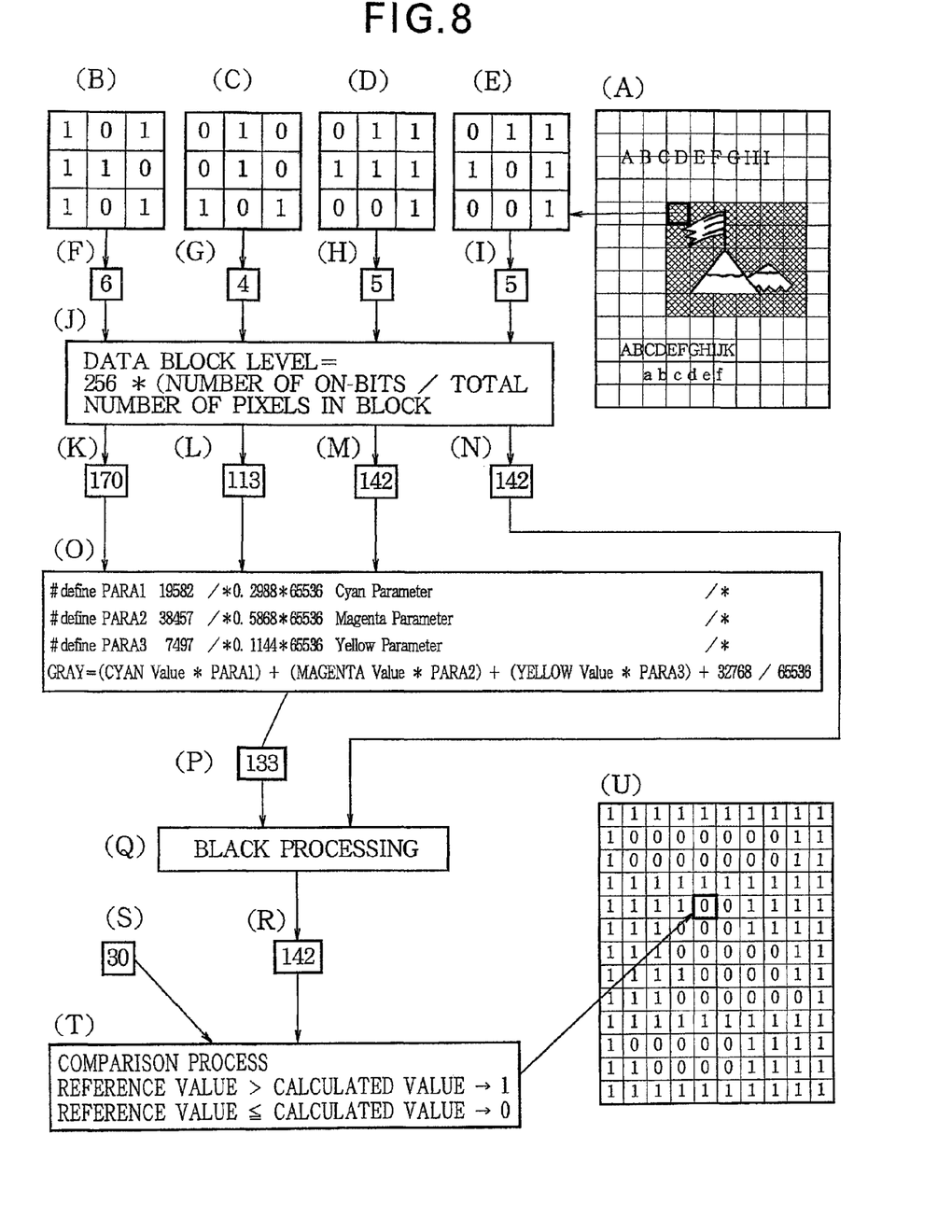
FIGS. 8(A) to (U) illustrate the flow of operations in the creation a data block table in the second embodiment.

The process that creates the data block table 55 after conversion of the original image to the gray image 51 is illustrated in FIG. 8. The image shown at (A) is the original image described by the print data before being converted to the gray image 51 by the gray conversion unit 50. The original image is a CMYK bi-level full color image created with two levels each of cyan, magenta, yellow, and black. The printable cyan image 41, printable magenta image 42, printable yellow image 43 and printable black image 44 are accordingly bi-level monochrome images. The minimum watermarking unit blocks into which the image at (A) in FIG. 8 is divided will be assumed for simplicity to be three-by-three pixel blocks, though in practice they may be larger, as in the first embodiment.

The bi-level data in one exemplary minimum watermarking unit block are indicated as on-bits ('1's) and off-bits ('0's) at (B) (cyan bit plane), (C) (magenta bit plane), (D) (yellow bit plane), and (E) (black bit plane) in FIG. 8. The calculated numbers of cyan, magenta, yellow, and black on-bits in the minimum watermarking unit block are shown at (F), (G), (H), and (I) in FIG. 8.

In the conversion of the bi-level data to 256-level data, the cyan, magenta, yellow, and black data block values in the minimum watermarking unit block are respectively calculated from the numbers of cyan, magenta, yellow, and black on-bits by the formula (6) given below, which is also shown at (J) in FIG. 8.

Data block level=256*(number of on-bits/total number of pixels in block)  (6)

The resulting cyan, magenta, yellow, and black data block values are shown at (K) (cyan), (L) (magenta), (M) (yellow), and (N) (black) in FIG. 8. These values are output as 256-level data obtained by calculating the cyan, magenta, yellow, and black pixel density in the minimum watermarking unit block by formula (6).

The gray value of the minimum watermarking unit block is calculated from the cyan, magenta, and yellow data block values, without using the black data block value, by the formula (7) given below, which is also shown at (O) in FIG. 8.

define PARA1 19582 /*0.2988*65536  (7)

Cyan Parameter*/ define PARA2 38457 /*0.5868*65536

Magenta Parameter*/ define PARA3 7497 /*0.1144*65536

Yellow Parameter*/

GRAY = ((CYAN Value*PARA1) + (MAGENTA Value*PARA2) + (YELLOW Value*PARA3) + 32768)/65536

The parameter values PARA1, PARA2, and PARA3 should be adjusted according to the characteristics of the print engine 58. The parameter values shown above have been given as an example, and may be modified as necessary.

The gray value of the minimum watermarking unit block resulting from conversion of the original image to the gray image 51 is shown at (P) in FIG. 8.

Next, a black processing operation is performed as indicated at (Q) in FIG. 8, by adding together the gray value of the minimum watermarking unit block and the black data block value shown at (N) in FIG. 8. Both of these input values are 256-level values. The gray density calculated as the result is also limited a 256-level value, and is therefore limited to a maximum gray density value of 256, so the addition operation is weighted, giving the result shown at (R) in FIG. 8.

The calculated gray density value is compared with the reference density value (threshold value) shown at (S) in FIG. 8. The comparison process is performed as shown at (T) in FIG. 8. If the reference density value exceeds the calculated gray density value, the comparison result is one ('1'); if the reference density value is equal to or less than the calculated gray density value, the comparison result is zero ('0'). The one or zero result given by the comparison process for each watermarking unit block is entered into the data block table 55 that includes the results for all the data blocks, as shown at (U) in FIG. 8.

Referring to the data block table 55, the watermarking unit 56 embeds electronic watermark data in the printable black image 44. The electronic watermark data are embedded only in blocks in which the results in the data block table 55 are indicated by one's. The embedded electronic watermark data are the embedding data 18 provided by the host device 10. When the electronic watermark data have been embedded in the printable black image 44, the printable black image 44 becomes the watermarked printable black image 57.

Finally, the print engine 58 prints the printable cyan image 41, the printable magenta image 42, the printable yellow image 43, and the watermarked printable black image 57 on a sheet of printing media.

As described above, the differences between the first and second embodiments are that the image creation unit 13 in the second embodiment creates bi-level image printing data for four colors, including cyan, magenta, yellow, and black data planes. Since the second embodiment uses bi-level image data, the second embodiment operates at higher speed than the first embodiment, which uses 256-level image data. Since the image creation unit 13 in the second embodiment permits four-color input, the second embodiment enables both the black input data and black data generated from a common component of the printable cyan, magenta, and yellow images 41, 42, 43 to be used when the watermark is embedded. This scheme improves the quality of the embedded watermark. Other effects of the second embodiment are the same as in the first embodiment.

In the first and second embodiments described above, although a predetermined reference density value (threshold value) is used, a user of the printer may enter a command such as a printer job language (PJL) command to specify the reference density value.

When the data block table 27 or 55 has been completed, if the number of watermarkable blocks is less than the number of the blocks of embedded electronic watermark data, the user may be notified by a message or indication displayed on the operator panel of the printer.

The data block table 27 or 55 can then be recreated by a re-evaluation process using a lower threshold value, for example, to find an adequate number of blocks for embedding the watermark data.

The invention is not limited to embedding electronic watermark data in only the black data plane as in the embodiments above. Monochrome watermark data may be embedded in the cyan, magenta, or yellow data plane instead, or embedded simultaneously in a plurality of data planes. Alternatively, the watermark itself may be a color image instead of a monochrome image.

Those skilled in the art will recognize that further variations are possible within the scope of the invention, which is defined in the appended claims.

What is claimed is:

1. An image data processing apparatus for processing multi-color image data including first image data of a first color and first image data of a plurality of primary colors, received from a host device to embed an electronic watermark, the image data processing apparatus comprising:
   an image generator for generating, from the first image data of the first color and the first image data of the primary colors, a second image data of the first color and second image data of the primary colors;
   an image converter for converting the second image data of the primary colors to generate first image data of a second color;
   a processing unit for processing the first image data of the second color and the second image data of the first color to generate a second image data of the second color;
   a decision unit for dividing the multi-color image data into a plurality of blocks representing different image areas and deciding, based on the second image data of the second color in said each block in the plurality of blocks, whether the block is watermarkable; and
   a watermarking unit for embedding the electronic watermark into each watermarkable block by modifying at least the first image data of the first color.

2. The image data processing apparatus of claim 1, wherein the first color is black.

3. The image data processing apparatus of claim 2, wherein the second color is gray.

4. The image data processing apparatus of claim 1, wherein the image converter calculates a weighted sum of the second image data of the primary colors and the processing unit adds the second image data of the first color to the weighted sum.

5. The image data processing apparatus of claim 1, further comprising an output unit for combining the first image data of the first color, after modification of the watermarkable blocks, with the first image data of the primary colors to generate watermarked output image data.

6. The image data processing apparatus of claim 1, wherein the first image data of the first color, and the first image data of the primary colors received from the host device are bi-level image data, and the second image data of the first color and the second image data of the primary colors output from the image generator are gray scale data.

7. An image data processing system comprising the image data processing apparatus of claim 1 and the host device.

8. A method of processing unit multi-color image data including a first image data of a first color and first image data of a plurality of primary colors, received from a host device to embed an electronic watermark, the method comprising:
   generating, from the first image data of the first color and the first image data of the primary colors, a second image data of the first color and second image data of the primary colors;

converting the second image data of the primary colors to generate first image data of a second color;

processing the first image data of the second color and the second image data of the first color to generate a second image data of the second color;

deciding, for each block of a plurality of blocks representing different image areas into which the multi-color image data is divided, based on the second image data of the second color in said each block in the plurality of blocks, whether the block is watermarkable; and embedding the electronic watermark into each watermarkable block by modifying at least the first image data of the first color.

\* \* \* \* \*